United States Patent [19]

Gull

[11] Patent Number: 5,201,234

[45] Date of Patent: Apr. 13, 1993

[54] SUPPORT

[75] Inventor: Kurt Gull, Tuttlingen, Fed. Rep. of Germany

[73] Assignee: Delma elektro-und medizinische Geraetebau Gesellschaft mbH, Tuttlingen, Fed. Rep. of Germany

[21] Appl. No.: 817,178

[22] Filed: Jan. 6, 1992

[30] Foreign Application Priority Data

Jan. 10, 1991 [DE] Fed. Rep. of Germany ... 9100250[U]

[51] Int. Cl.$^5$ .............................. F16H 27/02
[52] U.S. Cl. ..................... 74/89.15; 74/98; 74/105; 414/917
[58] Field of Search ............. 74/89.14, 89.15, 96, 74/98, 105, 424.8 R; 414/680, 917

[56] References Cited

U.S. PATENT DOCUMENTS

| | | | |
|---|---|---|---|
| 1,757,772 | 5/1930 | Johnson | 414/917 X |
| 2,514,314 | 7/1950 | Denton | 74/89.14 X |
| 3,320,698 | 5/1967 | Hummel | 74/89.15 X |
| 4,061,049 | 12/1977 | Beurrier | 74/424.8 R |
| 4,441,376 | 4/1984 | Tobey | 74/105 X |
| 4,635,493 | 1/1987 | Buckley | 414/917 X |
| 4,711,613 | 12/1987 | Fretwell | 414/917 X |

FOREIGN PATENT DOCUMENTS 52-20552  2/1977  Japan .................... 414/917

Primary Examiner—Allan D. Herrmann
Assistant Examiner—David W. Laub
Attorney, Agent, or Firm—Townsend and Townsend

[57] ABSTRACT

A support for holding and adjusting the vertical position of medical apparatus comprises a bearing housing (10), a pivot arm (11) which is preferably vertically pivotally hinged on the bearing housing (10) and is formed to carry an electromedical apparatus, and a motor (12) for the vertical pivoting of the pivot arm (11) which is arranged on the bearing housing (10), wherein a force transmitting device (13, 14, 15, 25) is provided between the motor (12) and the pivot arm (11) which converts the rotary movement of the motor (10) into a pivotal movement of the pivot arm (11).

15 Claims, 5 Drawing Sheets

SUPPORT

BACKGROUND OF THE INVENTION

It is known to use supports, in particular pivot supports for the most diverse tasks. Pivot supports are in particular used in the medical devices in order, with the aid of such a support, to bring a corresponding medical apparatus into an ideal position of use.

In this respect it is necessary to arrange heavy loads, i.e. electromedical apparatus or the like, at different levels without a large expenditure of force, which normally takes place by pivoting a pivot arm of the support about a horizontal axis.

In this respect a spring compensation for the load or a hydraulic drive are provided for the known supports. A spring compensation has the disadvantage that balancing is only possible for a narrow range of loads. A hydraulic drive admittedly permits the compensation of both light and also heavy loads, however, a disadvantage is that hydraulic drives are expensive and tend to leak in the course of time, in particular with long term use.

The problem underlying the present invention is how to provide a support which can be easily pivoted, preferably vertically, independent of the respective load arranged thereon and which also operates reliably in long term use.

SUMMARY OF THE INVENTION

This problem is satisfied in accordance with the invention by a support comprising a bearing housing, a pivot arm which is preferably vertically pivotally hinged on the bearing housing and is formed to carry a load, and a motor for the vertical pivoting of the pivot arm which is arranged on the bearing housing, wherein a force transmitting device is provided between the motor and the pivot arm which converts the rotary movement of the motor into a pivotal movement of the pivot arm.

Through the use of a motor, in particular of an electric motor, which is connected via a force transmitting apparatus with the pivot arm in order to convert the rotary movement of the motor into a pivot movement of the pivot arm, a support can be provided in accordance with the invention which can be pivoted with relatively small and light electric motors in order to move an apparatus arranged on the support into an ideal vertical position. Known solutions with hydraulic drives are in contrast liable to breakdown and are expensive.

In this respect it is in particular advantageous that the supply of energy to the motor can be realized in a simple manner which leads, in the same way as the general availability of electric motors, to a cost favorable construction of the support.

In a first practical layout of the invention, provision is made that the force transmitting device has a lever part which extends substantially approximately perpendicular to the pivot arm, with a drawing device acting on the lever arm and being so coupled to the motor via a transmission that the rotary movement of the motor is converted into a pivotal movement of the lever part. In order to obtain a large pivot path for a load arranged on the carrying arm with a relatively small pivotal movement of the lever part brought about by the motor, a support is favored in which the spacing between the effective pivot point of the pivot arm and the point of action of the drawing device on the lever part only amounts to a fraction of the length of the pivot arm.

In an expedient practical embodiment of the invention provision is made that the lever part is formed as a lever lug firmly connected to the pivot arm, with the lug extending substantially perpendicular to the pivot arm.

A particularly advantageous embodiment of the invention is characterized in that the drawing device has a threaded spindle which can be driven from the motor to execute a rotary movement, with the threaded spindle being so coupled to a draw linkage which acts on the lever part that the rotary movement of the threaded spindle is converted into a linear movement of the draw linkage, with a pivot bearing being provided which permits a pivot movement of the draw linkage relative to the bearing housing.

In order to always ideally exploit the tension force generated by the motor provision is made, in accordance with a further layout of the invention, that the motor is pivotally arranged on the bearing housing so that the motor force transmitted by means of the threaded spindle acts axially on the draw linkage independently of the pivot position of the pivot arm.

A support which is easily constructed results when the threaded spindle which axially aligned with the draw linkage forms the output drive member of a transmission energized by the motor.

In order to avoid a separate fixing device for locking the pivot arm in a selected position provision is made that the transmission is a worm drive.

In order to not only ideally exploit the motor force for the pivotal movement but also to keep the pivot moment for the pivot arm generated by the motor via the lever lug in a particularly favorable range provision is made that the motor is so pivotally arranged on the bearing housing that the threaded spindle and the draw linkage which is axially arranged relative thereto extends essentially parallel to the pivot arm when the pivot arm is located at the center of its pivotal range.

A further advantageous layout of the invention is characterized in that the draw linkage has two draw bars arranged parallel to and spaced apart from one another which are coupled at their one ends via a mounting block with the threaded spindle and which are respectively hinged at their other ends to respective lever lugs fixedly connected to the pivot arm. In this way a fork-like draw linkage is provided which can be so arranged in the bearing housing that cables and lines to a medical apparatus arranged as a load on the pivot arm, in particular supply cables, can be guided unhindered through the bearing housing and the pivot arm.

In order to enable a positionally correct arrangement of the load on the support independent of the pivotal position of the corresponding pivot arm an embodiment is preferably provided in which the pivot arm has an upper part and a lower part arranged parallel thereto and carrying the lever part, with both the upper and also the lower parts being pivotally connected at one end to the bearing housing and at the other end to a load housing in such a way that a parallelogram linkage is formed by means of which the load housing is guided in parallel so that it is horizontally aligned independent of the respective pivotal position of the pivot arm.

In order to be able to move even very heavy loads by means of relatively small electric motor an embodiment is preferably provided in which tension springs are arranged between the bearing housing and the pivot arm. The springs are hinged to the lever lugs at their ends associated with the pivot arm. The tension springs are preferably formed as gas tension springs.

For movement of the load into the required position of use a further degree of freedom can be provided in a simple manner if the bearing housing which carries the pivot arm is rotatably journalled on a carrying support element about a preferably vertical axis.

The invention will now be explained in more detail in the following by way of example and with reference to the drawings, in which are shown:

BRIEF DESCRIPTION OF THE DRAWINGS

In the various figures of the drawings components which correspond to one another are provided with the same reference numerals.

DESCRIPTION OF THE PREFERRED EMBODIMENTS

Figure 1:
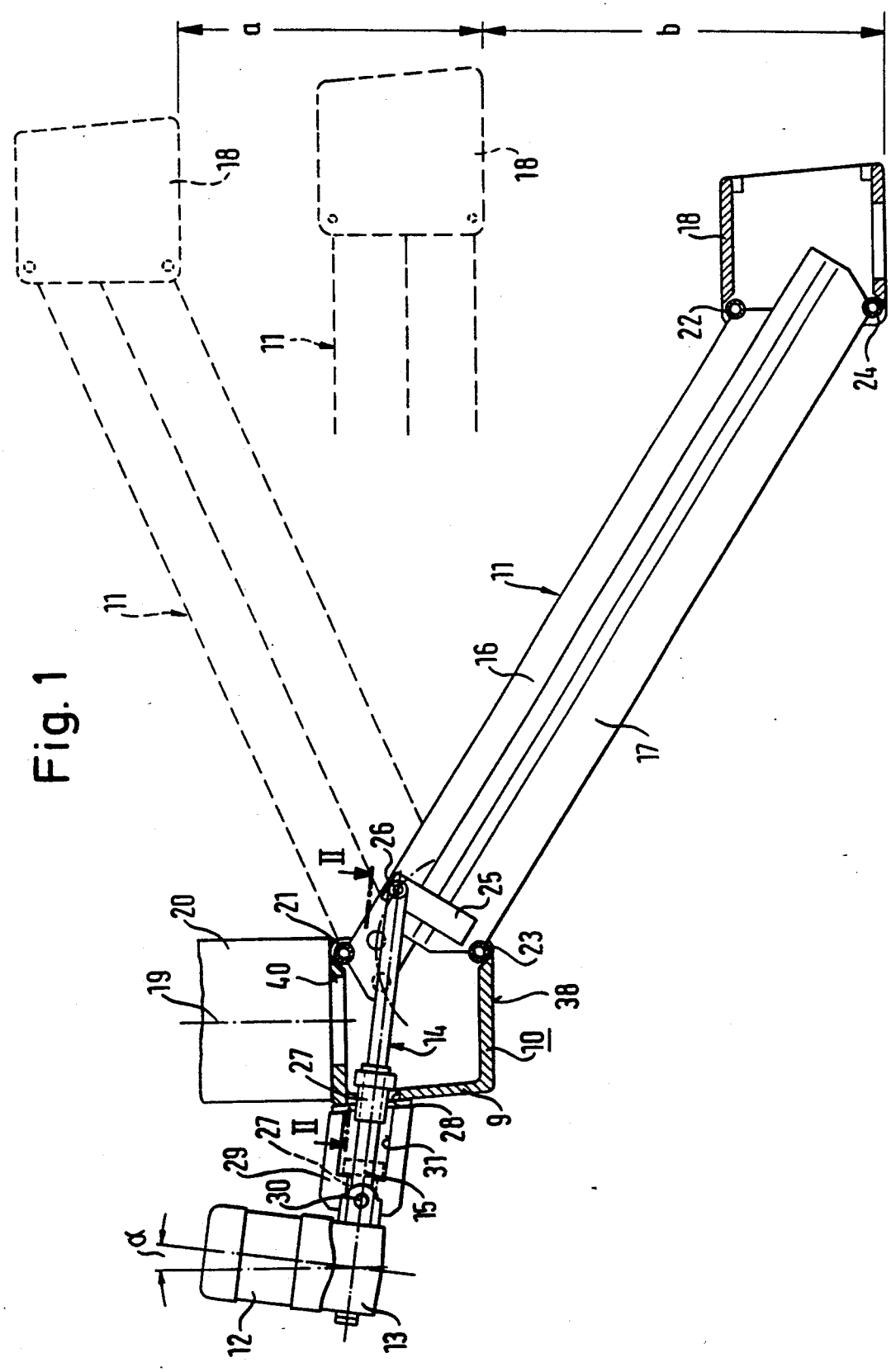
FIG. 1 a schematic partly sectioned sideview of a support in accordance with the invention, FIG. 2 a schematic section essentially on the line II—II in FIG. 1, FIG. 3 a schematic partly sectioned sideview of a support in accordance with the invention with gas tension springs, FIG. 4 a schematic section essentially on the line IV—IV in FIG. 3, FIG. 5 a schematic illustration of the motor pivot position in the upper end position of the pivot arm, and FIG. 6 a schematic illustration of the motor pivot position in the lower end position of the pivot arm.

FIG. 1 shows a support which is secured by a ceiling tube 20 in a non-illustrated manner to the ceiling of a room in such a way that it is rotatable about a vertical axis 19. A bearing housing 10 for a pivot arm 11 is secured to the bottom of the ceiling tube 20.

The pivot arm 11 has an upper part 16 which is pivotally mounted at its one end with a horizontal axis of rotation to the bearing housing 10 by means of a pivot bearing 21 forming a fixed point of rotation. A load housing 18 is attached by means of a pivot bearing 22 with a horizontal axis of rotation to the other end of the upper part 16 of the pivot arm 11.

Parallel to the upper part 16 the pivot arm 11 has a lower part 17 which is connected at its one end via a lower pivot bearing 23 with a horizontal axis of rotation to the bearing housing 10 and is connected at its other end via a lower pivot bearing 24 with a horizontal axis of rotation with to load housing 18.

The two pivot bearings 21, 23 arranged on the bearing housing 10 have a fixed spacing from one another, independently of the pivot position of the pivot arm 11, in the same way as the pivot bearings 22, 24 provided on the load carrying housing 18. In corresponding manner the upper pivot bearings 21, 22 on the upper part 16 of the pivot arm 11 and the lower pivot bearings 23, 24 on the lower part 17 of the pivot arm 11 have a fixed spacing as a consequence of the invariable length of the pivot arm parts, so that the pivot bearings 21, 22, 23, 24 together with the two part pivot arm 11 represent a parallel guidance system for the load carrying housing 18 by which the load carrying housing 18 is always horizontally aligned irrespective of the pivotal position of the pivot arm 11. The upper part 16 and the lower part 17 of the pivot bearings 21, 22, 23, 24 thus form a parallelogram linkage.

In the region of the end of the pivot arm 11 facing the bearing housing 10 lever lugs 25 are secured to the lower part 17 and extend essentially radially with reference to the lower pivotal bearing 23 on the bearing housing 10. A draw linkage 14 is attached by hinges 26 to the other ends of the lever lugs remote from the pivot bearing 23, with the draw linkage extending essentially perpendicular to the lever lugs 25.

The lever lugs 25 are thereby made so small in relationship to the length and thickness of the pivot arm 11 that they can be well housed from the spatial point of view in the pivot arm 11 without hindering the passage of cables and lines through pivot arm 11. The length of the lever lugs 25 is preferably smaller than the length of the pivot arm 11 by an order of magnitude of a factor ten.

The draw linkage 14 is secured at its ends remote from the hinges 26 to a spindle nut 27 into which a threaded spindle 15 is screwed which forms the output drive side of a transmission 13.

The input drive side of the transmission 13, which is not shown in detail, is formed by a worm wheel which meshes with a worm section arranged on the threaded spindle 15 and which is energized by an electric motor 12.

Figure 2:
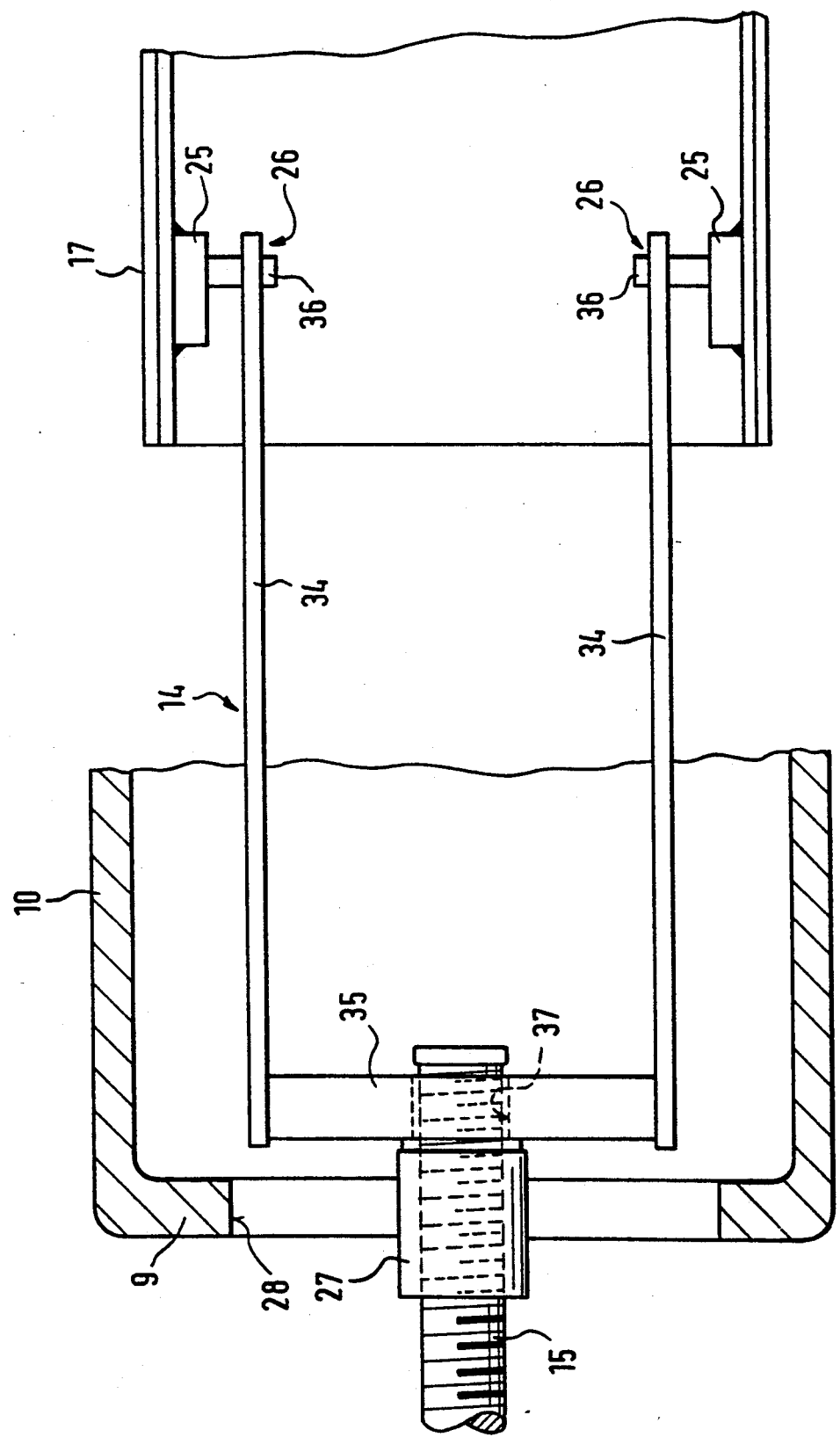

In the embodiment of FIG. 2 the draw linkage 14 has two draw bars 34 which extend parallel to and spaced apart from one another and which are secured to a block-shaped mounting block which is rigidly connected with the spindle nut 27. The draw bars 34 are connected to the lever lugs 25 via bearing pins 36 which extend through corresponding bearing openings in the draw bars 34, which are not shown in more detail, so that the hinges 26 are formed.

Securing rings (not shown) can for example be provided in order to prevent the draw lugs 34 from sliding off the bearing pins 36.

In order to enable a displacement of the draw linkage 14 relative to the threaded spindle 15 in its longitudinal direction an opening 37 is provided in the mounting block 35 through which the threaded spindle 15 extends.

In this arrangement the fork-like design of the draw linkage 14 with the double-version of the draw bars 34 is important because cables which are not shown but which come from above through the ceiling tube 20 and through its lower opening 40 can in this way also be guided between and through the draw bars 34 to an apparatus which is to be lifted and which is arranged on the load carrying housing. The arrangement or assembly comprising the draw linkage 14, the spindle nut 27 and the threaded spindle 15 extends through an opening 28 provided in the upper region of a rear sidewall 9 of the bearing housing 10 which is made sufficiently broad that it does not hinder a displacement of the draw linkage 14 for the longitudinal adjustment of this assembly.

In order to mount the electric motor 12 on the bearing housing 10 a mounting clamp 29 is attached to the bearing housing 10 and the housing of the electric motor 12 is hinged to the mounting clamp via a motor pivot bearing 30 with a horizontal axis of rotation and the mounting clamp has an inner space 31 for accommodating the threaded spindle 15 and/or the spindle nut 27 and optionally a section of the draw linkage 14. The horizontal axis of the motor pivot bearing intersects the longitudinal axis of the threaded spindle.

If the pivot arm 11 of the described support is to be pivoted from its lower end position shown in continuous lines in FIG. 1 into its upper end position shown in broken lines in FIG. 1, then the threaded spindle 15 is driven by the motor 12 so that it executes a rotational movement such that the spindle nut 27 which is arranged thereon is displaced in FIG. 1 towards the left and thereby draws the draw linkage 14 to the left.

Figure 5:
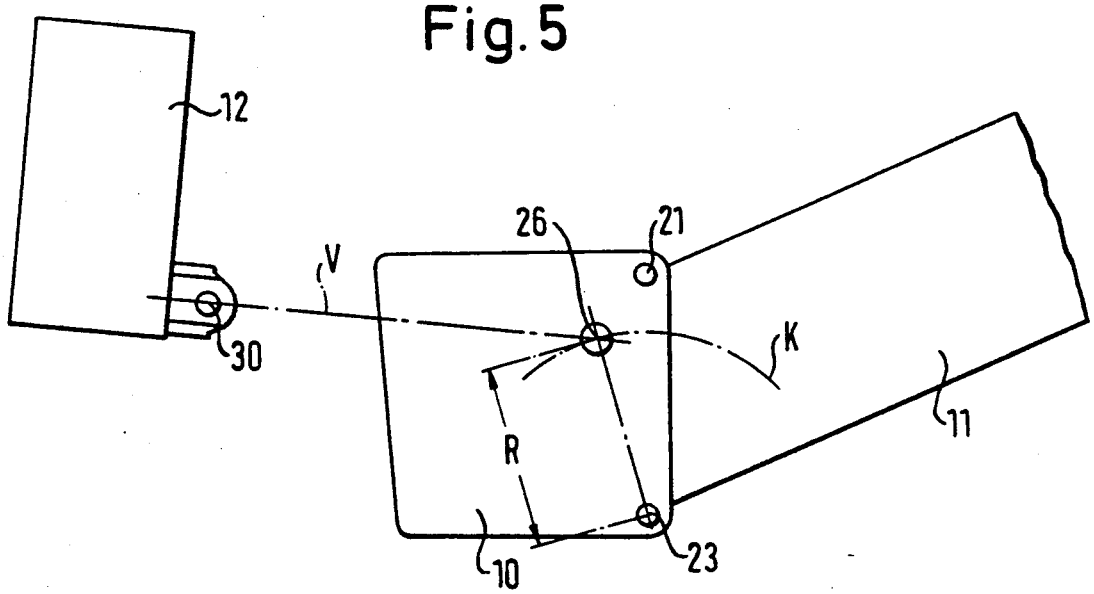
Figure 6:
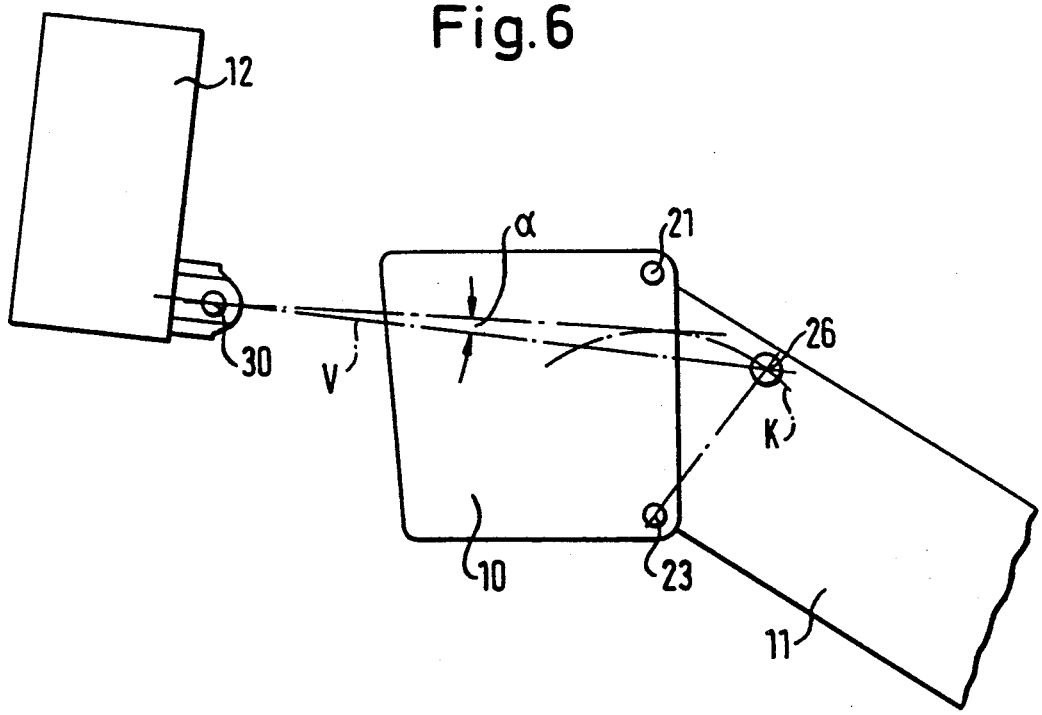

As can be seen with reference to FIG. 5 and 6 the hinge 26 thereby moves along a circular arc K the radius of which is determined by the spacing R of the hinge 26 from the fixed lower pivot bearing 23 which represents the effective pivot point of the pivot arm 11 with respect to the force transmission. In this respect the connection line between the motor pivot bearing 30 and the hinge 26, which represents the line of action V of the tension force exerted by the motor 12 pivots through an angle α. This pivotal movement is made possibly by the hinge mounting of the motor 12 by means of the motor pivot bearing 30.

As soon as the pivot arm 11 adopts its upper end position illustrated in broken lines in FIG. 1, in which the spindle nut 27— as likewise illustrated in broken lines in FIG. 1— contacts an abutment formed by the mounting clamp 29, for example, the hinge 26 is located in the position in FIG. 5.

As the effective lever arm for the torque which is required to pivot the pivot arm 11 and is generated from the tractive force of the motor 12 via the lever lugs 25 depends on the distance of the line of action V of the tractive force from the fixed pivot bearing 23, and as the distance of the line of action V of the tractive force from the pivot bearing 23 first increases and then reduces again during pivoting of the lever arm 11, the torque which brings about the pivotal movement is also initially larger and then again reduces.

In this way an increase of the load moment which is brought about by an extension of the effective lever arm 11 during the pivotal movement is compensated.

As the lower surface 38 of the bearing housing 10 must be arranged above head height so that people can not bang against it, the pivotal range of the carrying arm 11 relative to its horizontal position is asymmetrically arranged in order to enable a sufficient downward pivotal movement of the load carrying housing. If the pivot arm— as illustrated in FIG. 1— is pivoted from its horizontal position upwardly into its end position then the load carrying housing 18 is raised by the distance a, which amounts, for example, to 300 mm. In contrast the load carrying housing can be lowered out of its horizontal position downwardly by the distance b which is for example 400 mm and is thus larger than the distance a.

In accordance with this asymmetrical arrangement of the pivot range of the pivot arm 11 the motor 12 is tiltedly arranged at the bearing housing 10 so that the threaded spindle 15, which represents the output drive member of the transmission 13, is always inclined by an acute angle which differs from zero relative to the horizontal. In this way the line of action V of the tractive force can be arranged so that the reduction of the torque transferred to the pivot arm 11 in the end positions of the pivot range is kept as low as possible.

The locking of the pivot arm 11 in its upper end position of the pivot range and also in any desired intermediate position takes place in advantageous manner through the transmission 13 which is formed as a self-locking, i.e. non-reversible, worm drive. In place of the worm drive one can however also provide another transmission which translates the rotation of movement of the motor 12 into a linear movement of the drawbar, it is then necessary to provide a suitable locking mechanism for the pivot arm.

Figure 3:
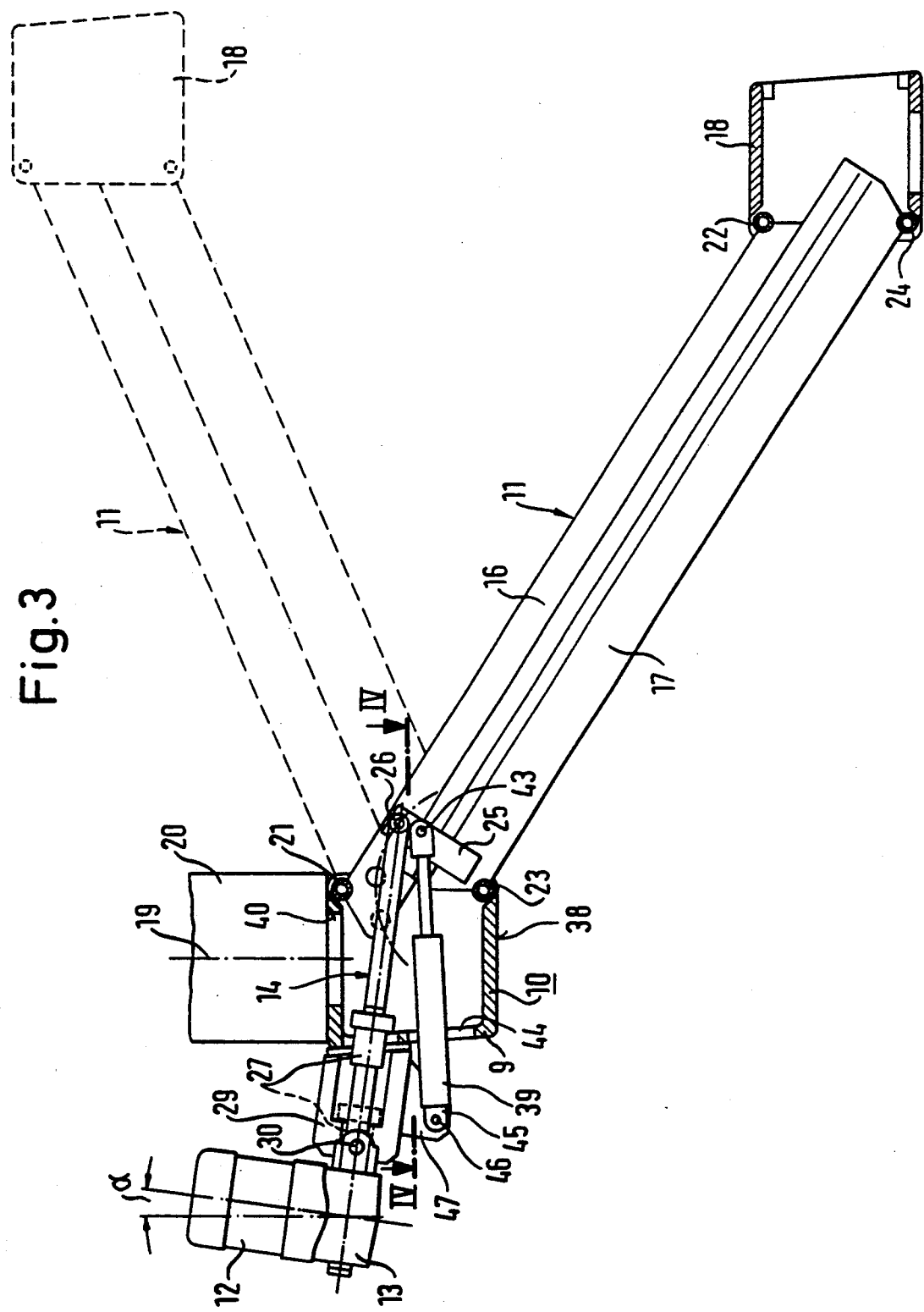
Figure 4:
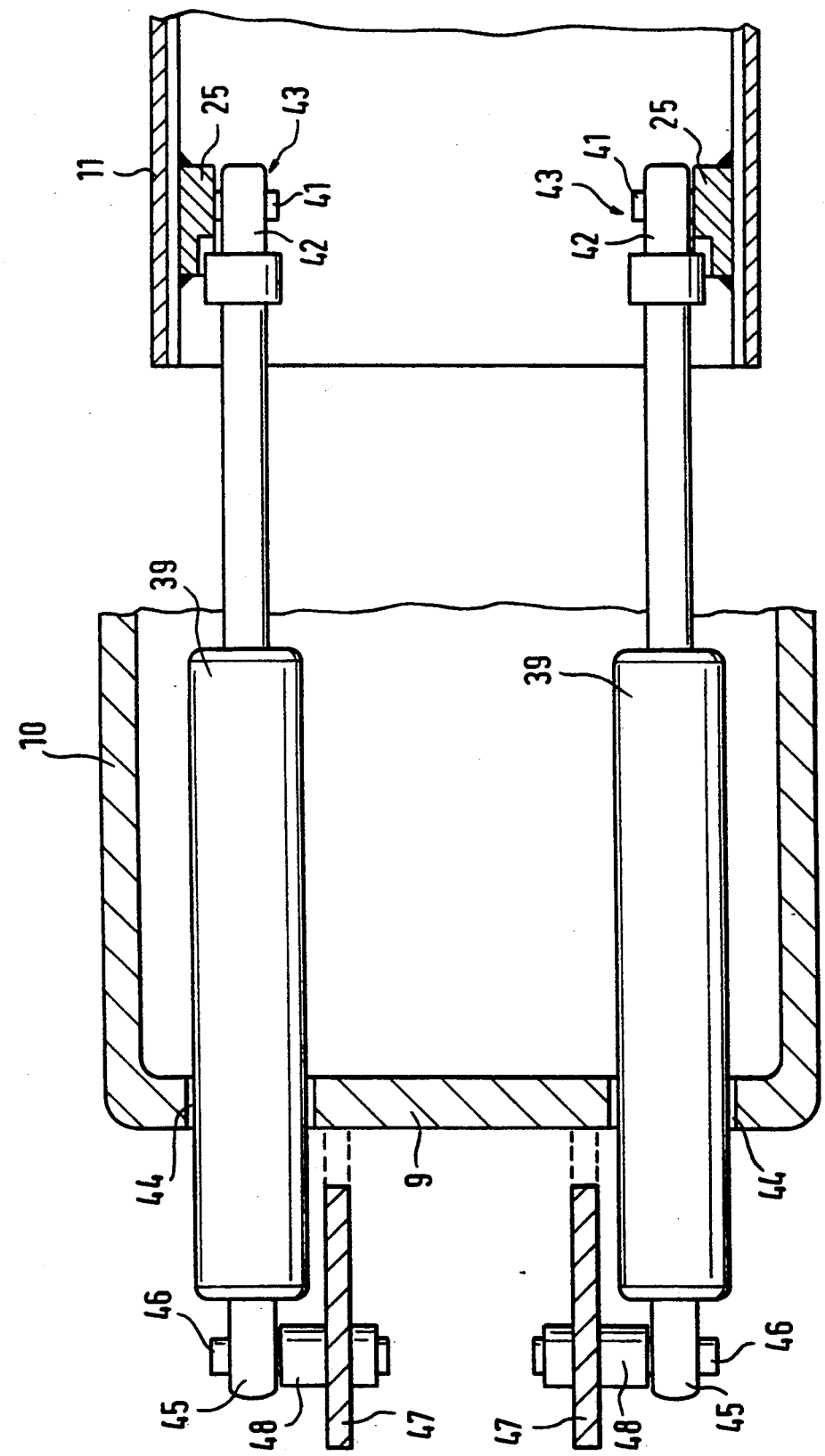

As shown in FIG. 3 and 4 tensile springs can be arranged between the lever lugs 25 and the bearing housing 10, in particular gas tension springs 39, in order to secure even relatively heavy apparatus to the load carrying housing 18. The two gas tension springs 39 which extend parallel to one another are arranged essentially below the draw bars in order not to hinder the guidance of a cable from the ceiling tube 20 through the bearing housing 10 to an apparatus secured to the load carrying housing 18. Pins 41 are provided on the lever lugs 25 for the mounting of the gas tension springs 39 to the latter and mounting elements 42 arranged at one end of the gas tension springs 39 are pushed onto these pins, so that in each case a hinge 43 is formed. Non-illustrated securing rings can for example be placed on the pins 41 to secure the mounting elements 42.

The gas tension springs 39, which extend through corresponding openings 44 in the rear sidewall of the bearing housing 10 have corresponding mounting elements 45 at their other ends which are pivotally plugged onto bearing pins 46 and are secured in non-illustrated manner against sliding off. The bearing pins 46 are in turn secured to holding lugs 47 mounted to the bearing housing 10.

The holding lugs 47, the mounting of which to the bearing housing 10 is only illustrated in broken lines in FIG. 4, can be secured via the clamp 29 and/or directly to the bearing housing 10. In order to hold the mounting sections 45 of the gas tension springs 39 at a spacing relative to the holding lugs 47 on the bearing pins 46 spacing sleeves 48 are pushed onto the bearing pins 46 which are welded, in non-illustrated manner, to the holding lugs 47. At the side of the holding lugs 47 remote from the gas tension springs 39 securing rings are mounted onto the bearing pins 46.

The gas tension springs 39, which are hinged to the lever lugs 25 between the hinge 26 and the pivot bearing 23 have in the farthest retracted state a force of ca. 1500 N and in the fully extended state an enforce of 2400 N. The tensile force which is exerted by the gas tension springs 35 onto the lever lugs 25, in order to assist the tractive force generated by the motor 12 in pivoting the carrying arm 11, is thus increased in the fully extended state by 60% relative to the tractive force in the fully retracted initial state. The lifting and lowering of the load carrying housing 18 by a pivoting of the pivot arm 11 takes place with the support illustrated in FIGS. 3 and 4 in the same manner as described with reference to FIGS. 1 and 2.

What is claimed is:
1. Support comprising:
   a bearing housing (10),
   a pivot arm (11) vertically pivotally hinged on the bearing housing (10) and formed to carry a load,
   a motor (12) for vertical pivoting of the pivot arm (11) arranged on the bearing housing (10),
   a force transmitting device (13, 14, 15, 25) positioned between the motor (12) and the pivot arm (11) which converts a rotary movement of the motor (10) into a pivotal movement of the pivot arm (11), and
   means for rotatably mounting the bearing housing (10) to a fixed support element (20).
2. Support in accordance with claim 1, wherein the force transmitting device has a lever part (25) which extends substantially approximately perpendicular to the pivot arm (11), with a drawing device (14, 15) acting on the lever arm and being so coupled to the motor (12) via a transmission (13) that the rotary movement of the motor (12) is converted into a pivotal movement of the lever part (25).

3. Support in accordance with claim 2, wherein the spacing (R) between the effective pivot point of the pivot arm (11) and the point of action of the drawing device (14, 15) on the lever part (25) only amounts to a fraction of the length of the pivot arm (11).

4. Support in accordance with claim 2, wherein the lever part is formed as a lever lug (25) firmly connected to the pivot arm (11), with the lug extending substantially perpendicular to the pivot arm (11).

5. Support in accordance with claim 2, wherein the tension device has a threaded spindle (15) which can be driven from the motor (12) to execute a rotary movement, with the threaded spindle being so coupled to a draw linkage (14) which acts on the lever part (25) that the rotary movement of the threaded spindle is converted into a linear movement of the draw linkage (14), with a pivot bearing (30) being provided which permits a pivot movement of the draw linkage (14) relative to the bearing housing (10).

6. Support in accordance with claim 1, wherein the motor (12) is pivotally arranged on the bearing housing (10) so that the motor force transmitted by means of a threaded spindle (15) acts axially on the draw linkage (14) independently of the pivot position of the pivot arm (11).

7. Support in accordance with claim 6, wherein the threaded spindle (15) which is axially aligned with a draw linkage (14) forms an output drive member of a transmission (13) energized by the motor.

8. Support in accordance with claim 7, wherein the transmission (13) is a worm transmission.

9. Support in accordance with claim 6, wherein the motor (12) is so pivotally arranged on the bearing housing (10) that the threaded spindle (15) and a draw linkage (14) which is axially aligned relative thereto extends substantially parallel to the pivot arm (11) when the pivot arm (11) is located at the center of its pivot range.

10. Support in accordance with claim 5, wherein the draw linkage (14) has two draw bars (34) arranged parallel to and spaced from one another which are coupled at their one ends via a mounting block (35) with the threaded spindle (15) and are respectively hinged at their other ends to respective lever lugs (25) which are fixedly connected to the pivot arm (11).

11. Support in accordance with claim 1, wherein the pivot arm (11) has an upper part (16) and a lower part (17) arranged parallel thereto and carrying a lever part (25), with both the upper and also the lower parts (16 and 17 respectively) being pivotally connected at one end to the bearing housing (10) and at the other end to a load housing (18) in such a way that a parallelogram linkage is formed by means of which the load housing (18) is horizontally aligned in an orientation independent of the respective pivotal position of the pivot arm (11).

12. Support comprising:
a bearing housing (10);
a pivot arm (11) vertically pivotally hinged on the bearing housing (10) and formed to carry a load;
a motor (12) for vertical pivoting of the pivot arm (11) which is arranged on the bearing housing (10);
a force transmitting device (13, 14, 15, 25) provided between the motor (12) and the pivot arm (11) which converts a rotary movement of the motor (10) into a pivotal movement of the pivot arm (11); and
tension springs arranged between the bearing housing (10) and the pivot arm (11).

13. Support in accordance with claim 12, wherein the tension springs (39) are hinged at an end associated with the pivot arm (11) to lever lugs (25) secured to pivot arm 11.

14. Support in accordance with claim 12, wherein the tension springs are formed as gas tension springs (39).

15. Support comprising:
a bearing housing;
a pivot arm vertically pivotally hinged on the bearing housing and formed to carry a load;
a motor vertically pivotally hinged to the bearing housing and having a threaded spindle extending from the motor;
a spindle nut threadably coupled to the threaded spindle; and
a draw linkage rigidly connected to the spindle nut and pivotally connected to the pivot arm, so that rotary motion of the threaded spindle produces vertical pivoting of the pivot arm and the motor.

* * * * *